United States Patent
Ramasamy et al.

(10) Patent No.: US 6,953,566 B2
(45) Date of Patent: Oct. 11, 2005

(54) PROCESS FOR PREPARING CATHODE MATERIAL FOR LITHIUM BATTERIES

(75) Inventors: Chandrasekaran Ramasamy, Karaikudi (IN); Vasudevan Thiagarajan, Karaikudi (IN); Mani Ariyanan, Karaikudi (IN); Gangadharan Ramaiyer, Karaikudi (IN)

(73) Assignee: Council of Scientific & Industrial Research, New Delphi (IN)

( * ) Notice: Subject to any disclaimer, the term of this patent is extended or adjusted under 35 U.S.C. 154(b) by 0 days.

(21) Appl. No.: 10/108,695

(22) Filed: Mar. 29, 2002

(65) Prior Publication Data

US 2003/0185743 A1 Oct. 2, 2003

(51) Int. Cl.[7] .............................. C01D 1/02; H01M 4/52; H01M 4/58
(52) U.S. Cl. ................. 423/594.6; 423/594.4; 429/223; 429/231.3
(58) Field of Search ........................ 423/594.4, 594.6; 429/223, 231.3

(56) References Cited

U.S. PATENT DOCUMENTS 5,567,401 A * 10/1996 Doddapaneni et al. ... 423/179.5
6,054,110 A    4/2000 Yamada et al.
6,395,423 B1 * 5/2002 Kawakami et al. ......... 429/215

FOREIGN PATENT DOCUMENTS

| EP | 0 653 797 | 5/1995 |
|---|---|---|
| JP | 52-14597 | 2/1977 |
| JP | 7-153466 | 6/1995 |
| JP | 10/279315 | 10/1998 |
| WO | WO 97/48645 | 12/1997 |

OTHER PUBLICATIONS

Patent Abstracts of Japan, vol. 017, No. 022 (E–1307), Jan. 14, 1993 & JP 04 249074 A (Sony Corp), Sep. 4, 1992.

Derwent Publications Ltd., London, GB:, AN 2001–555914 XP002224554 & KR 2001 028040 A (Pohang Ind Sci Res Inst), Apr. 6, 2001.

J.J. Kingsley et al., "Combustion synthesis of fine–particle metal aluminates", Journal of Materials Science, vol. 25, No. 2B, Feb. 1, 1990, pp. 1305–1312.

* cited by examiner

*Primary Examiner*—Stanley S. Silverman
*Assistant Examiner*—Jonas N. Strickland
(74) *Attorney, Agent, or Firm*—Sughrue Mion, PLLC

(57) ABSTRACT

The present invention relates to a novel process based on solid state thermal reaction for the preparation of cathode materials for lithium secondary batteries such as rocking chair and intercalated batteries.

7 Claims, 2 Drawing Sheets

XRD PATTERN OF LiNiO$_2$ AT 600°C

XRD PATTERN OF LiNiO$_2$ AT 600°C

XRD PATTERN OF LiNiO$_2$ AT 500°C

US 6,953,566 B2

PROCESS FOR PREPARING CATHODE MATERIAL FOR LITHIUM BATTERIES

FIELD OF THE INVENTION

The present invention relates to a novel process based on solid state thermal reaction for the preparation of cathode materials for lithium secondary batteries such as rocking chair and intercalated batteries.

BACKGROUND OF THE INVENTION

Lithium compounds such as lithium cobaltate ($LiCoO_2$) and lithium nickelate ($LiNiO_2$) are widely used is cathode material for both lithium secondary cells and thin film micro-batteries due to its high reversibility to lithium ions, high cell capacity and less fading capacity over $LiMn_2O_4$.

In general, lithium cobaltate materials are prepared by solid state thermal method and soft chemistry (like sol-gel) methods. The common materials for the preparation of this cathode lithium cobaltate ($LiCoO_2$) are any one of the lithium salts viz. lithium nitrate or is lithium hydroxide, lithium acetate lithium carbonate with cobalt nitrate or cobalt oxide. Soft chemistry methods are mainly used to prepare the intercalation compounds at low temperatures and to reduce the particle size of the compounds. But the soft chemistry routes are multi-step procedures, prolonged time for calcination and expensive. Prolonged heating time, mechanic grinding and intermittent cooling are major drawbacks of solid state thermal procedures. Other preparation methods are also available in literature for preparation of lithium cobaltate like pulsed laser deposition, sputtering and electrostatic spray deposition. Lithium nickelate is also useful as a cathode in lithium secondary cells of high voltage to replace present low energy density secondary storage cells. In the art it is known to prepare lithium nickelate by reacting lithium nitrate, or lithium hydroxides or any other lithium salts with lithium nitrates, acetates, hydroxides or sulphates by a sol-gel process at a temperature in the range of 350–500° C. However, separation of the final product requires several steps.

In the preparation of intercalation compounds, any one of the following disadvantages are observed in the above conventional procedures.
1. Side reactions occur i.e., unexpected product.
2. Unreacted material is left behind which acts as impurity.
3. Partial reactions occur.
4. Several steps are needed for preparation.
5. Controlled conditions required.
6. Long calcination time
7. Nonhomogeneous reactant distribution during heating i.e., undesirable phases are formed.

Reference:
1. "Synthesis and electrochemical properties of $LiCoO_2$ spinel cathodes"—S. Chol and A. Manthiram, *Journal of the Electrochemical Society*, Vol. 149(2) (2002) A162–166.
2. "Fabrication of $LiCoO_2$ thin films by sol-gel method and characterization as positive electrodes for Li/$LiCoO_2$ cells"—M. N. Kim, H. Chung, Y. Park, J. Kim, J. Son, K. Park and H. Kim, *Journal of Power Sources*, Vol. 99(2001) 34–40.
3. "High temperature combustion synthesis and electrochemical characterization of $LiNiO_2$, $LiCoO_2$ and $LiMn_2O_4$ for lithium ion secondary batteries"—M. M. Rao, C. Liebenow, M. Jayalakshmi, M. Wulff, U. Guth and F. Scholz, *Journal of Solid State Electrochemistry*, Vol. 5, Issue 5(2001) 348–354.
4. "Lithiated cobaltates for lithium—ion batteries—Structure, morphology and electrochemistry of oxides grown by solid state reaction, wet chemistry and film deposition" C. Julien and S. Gastro-Garcia, *Journal of Power Sources*, Vol. 97–98 (2001) 290–293.
5. "Electrochemical characterization of layered $LiCoO_2$ films prepared by electrostatic deposition", Won-Sub Yoon, Sung-Ho Ban, Kyung-Keun Lee, Kwang-Bum Kim, Min Dyu Kim and Jay Min Lee, *Journal of Power Sources*, Vol. 97–98 (2001) 282–286.
6. "Emulsion-derived lithium manganese oxide powder for positive electrodes in lithium ion batteries" Chung-Hsin Lu and Shang-Wei Lin, *Journal of Power Sources*, Vol. 93 (2001) 14–19.
7. "Cobalt doped chromium oxides as cathode materials for secondary batteries for secondary lithium batteries" Dong Zhang, Branko N. Popov, Yury M. Poddrabansky, Pankaj Arora and Ralph E. White, *Journal of Power Sources*, Vol. 83 (1999)121–127.
8. "Synthesis and electrochemical studies of spinel phase $LiMn_2O_4$ cathode materials prepared by the Pechini process"—W. Liu, G. C. Farrington, F. Chaput and B. Dunn, *Journal of the Electrochemical Society.*, Vol. 143, No.3(1996) 879–884.
9. "Synthesis of electrochemical characterisation of $LiMO_2$ (M=Ni, $Ni_{0.75}Co_{0.25}$) for rechargeable lithium ion batteries", Chun-Chieh Chang, N. Scarr and P. N Kumta, *J. of Solid State Ionics*, Vol 112, 329–344 (1998).
10. "Structural and electrochemical properties of $LiNi_{0.3}Co_{0.7}O_2$ synthesized by different low temperature techniques", C. Julien, S. S. Michael and S. Ziolkewicz, *International Journal of Materials*, Vol. 1(1999), 29–37
11. "Synthesis and characterisation of $LiCoNi_{(1-y)}VO_4$ lithium insertion materials", S. Panero, P. Reale, F. Bonno, B. Serosati, M. Arrabito, D. Mazza and N. Pennazi, *J. of Solid State Ionics*", Vol. 128, 43–52, (2000)
12. "Preparation and characterisation of high density spherical $LiNi_{0.8}CoO_2$ cathode material for lithium secondary batteries", Jierond Ying, Chunrong Wan, Changyin Jiang and Yangxing Li, *J. of Power Sources*" Vol 99, (2001), 78–84
13. "High temperature combustion synthesis and electrochemical characterisation of $LiNiO_2$, $LiCoO_2$ and $LiMn_2O_4$ for lithium ion secondary batteries", M. M. Rao, C. Liebnow, M. Jayalakshmi, M. Wulff, U. Guth and F. Scholz, *J. of Solid State Electrochemistry*", Vol 5, Issue 5, 348–354 (2001)

OBJECTS OF THE INVENTION

The main object of the invention is to provide a process for the preparation of lithium cathode materials which overcomes the disadvantages of the prior art enumerated above.

It is another object of the invention, to provide a process for the manufacture of lithium cathode materials which does not involve the formation of side products.

It is a further object of the invention to provide a process for the manufacture of lithium cathode materials which does not result in impurities.

It is a firer object of the invention to provide a process for the manufacture of lithium cathode materials which does not involve a multiplicity of steps.

SUMMARY OF THE INVENTION

Accordingly the present invention relates to a solid state thermal process for the preparation of lithium cathode materials of the general formula $LiMO_2$ where M is Ni or Co comprising reacting solid lithium oxide ($Li_2O$) with metal compound selected from oxides and nitrates under controlled conditions.

In one embodiment of the invention, the metal oxide is $Co_3O_4$ and the Lithium oxide and the cobalt (II) oxide are mixed in stoichiometric condition.

In another embodiment of the invention, the reactants are heated at a temperature in the range of 450 to 750° C.

In a further embodiment of the invention the reactants are of analytical reagent grade.

In another embodiment of the invention, the metal nitrate is nickel nitrate.

In a further embodiment of the invention, urea or ammonium nitrate is added to the reaction mixture of lithium oxide and cobalt (II) oxide as self heat generating materials and ground well.

In yet another embodiment of the invention the ratio of $Li_2O+Co_3O_4$ mixture and urea or ammonium nitrate additive is 1:3.

In a further embodiment of the invention, the process comprises mixing solid lithium oxide and cobalt (II) oxide, mixing urea in the resultant mixture and grinding the final mixture, introducing the resultant mixture in a furnace and heating at a temperature in the range of 450 to 750° C. to obtain lithium cobaltate.

In one embodiment of the invention, the $Li_2O$ is mixed with $Co_3O_4$ in the following preferred proportions $Li_2O$: $Co_3O_4$=0.16; 0.84 (for 1 gram)

In another embodiment of the invention, the process comprises mixing solid lithium oxide and nickel nitrate and heating to a temperature in the range of 450 to 750° C. to obtain lithium nickelate.

In another embodiment of the invention, the lithium oxide and nickel nitrate are mixed in the ratio of 1:2.

DETAILED DESCRIPTION OF THE INVENTION

The present invention provides a simple single step reaction for the preparation of cathode materials for lithium secondary cells such as lithium cobaltate and lithium nickelate. The process comprises solid state mixing of the lithium oxide with the corresponding metal compound and heating with or without the addition of urea. The preferred temperature range for the heating which is carried out continuously in a furnace is 500 to 750° C. for a period of about 8 hours. The products formed were examined by X-ray diffraction for confirmation. The following reaction occurs during the thermal process when the metal is cobalt.

$$3Li_2O+2Co_3O_4+(O) \rightarrow 6LiCoO_2$$

$Li_2O$ is mixed with $Co_3O_4$ in the following desired proportions $Li_2O$: $Co_3O_4$=0.16: 0.84 (for 1 gram). It is preferred that the reaction takes place in an electric furnace. The materials used are all in the solid state.

Figure 3:
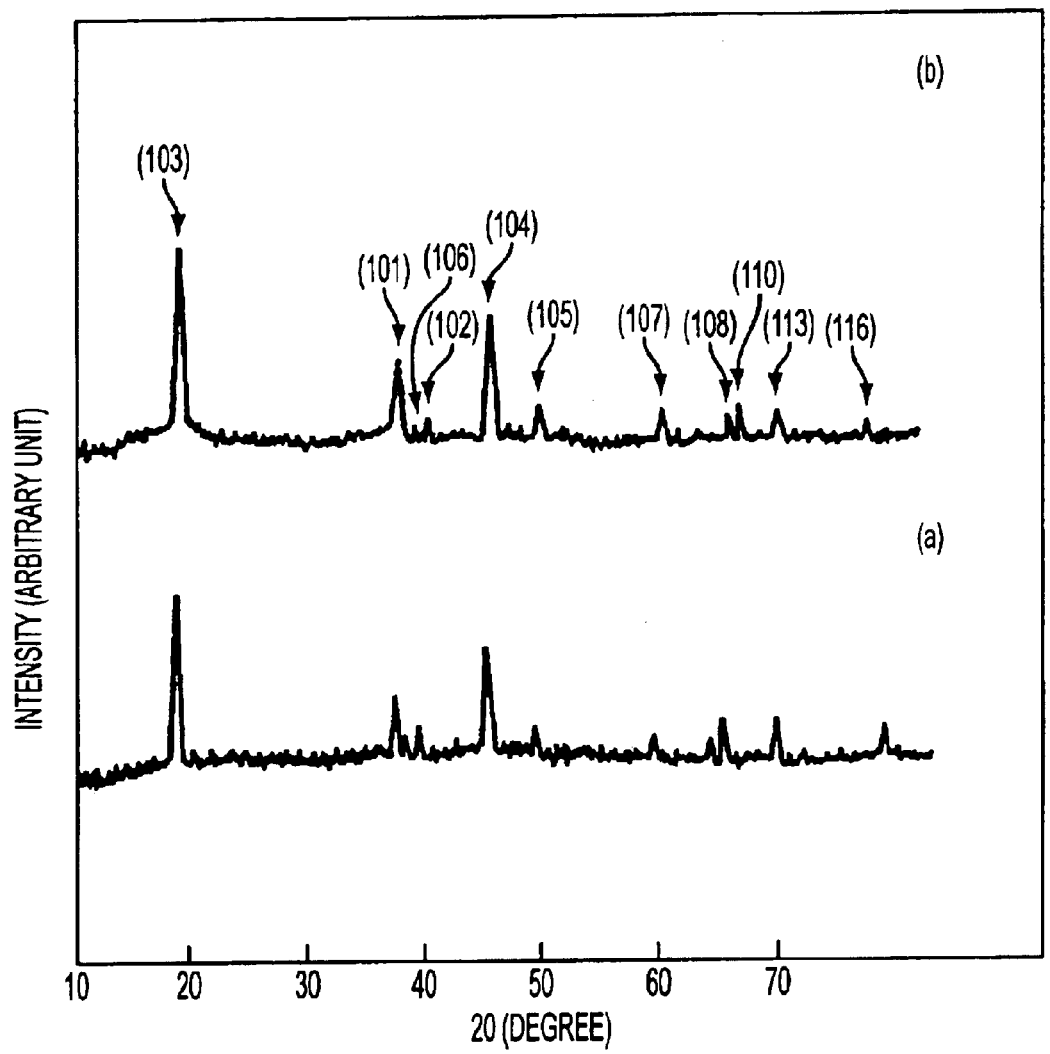
FIG. 3 shows the XRD pattern of $LiCoO_2$ prepared from $Li_2O+Co_3O_4$ at 700° C. with either urea (pattern (a)) or with ammonium nitrate (pattern (b)).

Preparation of $LiCoO_2$ Through Solid State Thermal Reaction:

(A) $Li_2O$ solid state material is allowed to react with solid $Co_3O_4$ under controlled conditions at moderate temperature which yields fairly very good sample of spinel structure useful as a very good intercalating cathode. Stoichiometric amount of Pure AR sample of $Co_3O_4$ is mixed with pure AR sample of $Li_2O$ in the cationic ratio of Li:Co is (1:1) for the preparation of $LiCoO_2$. This mixture is thoroughly mixed with urea in the ratio of 1:3 (mixture: urea). This uniform mixture was preheated at 300° C. for 3 hours. In order to obtain a better homogeneous mixture, this mixture is ground well with double distilled water free ethylene carbonate (EC). This mixture was again heated to 700° C. for 5 hours continuously to yield lithium cobaltate ($LiCoO_2$) which is evidenced by X-ray analysis (FIG. 3, pattern (a)).

(B) $Li_2O$ solid state material is allowed to react with solid $Co_3O_4$ under controlled conditions at moderate temperature which yields fairly very good sample of spinel structure useful as a very good intercalating cathode. Stoichiometric amount of Pure AR sample of $Co_{3O4}$ and pure AR sample of $Li_2O$ in the cationic ratio of Li:Co is (1:1) for the preparation of $LiCoO_2$. This mixture is thoroughly mixed with ammonium nitrate in the ratio of 1:3 (mixture: ammonium nitrate). This uniform mixture was preheated at 300° C. for 3 hours. In order to obtain a better homogeneous mixture, this mixture is ground well with double distilled water free ethylene carbonate (EC). Again this mixture was heated to 700° C. for 5 hours continuously to yield lithium cobaltate ($LiCoO_2$) which is evidenced by X-ray analysis (FIG. 3, pattern (b)).

The following reaction occurs during the thermal process.

$$3Li_2O+2Co_3O_4+(O) \rightarrow 6LiCoO_2$$

Figure 1:
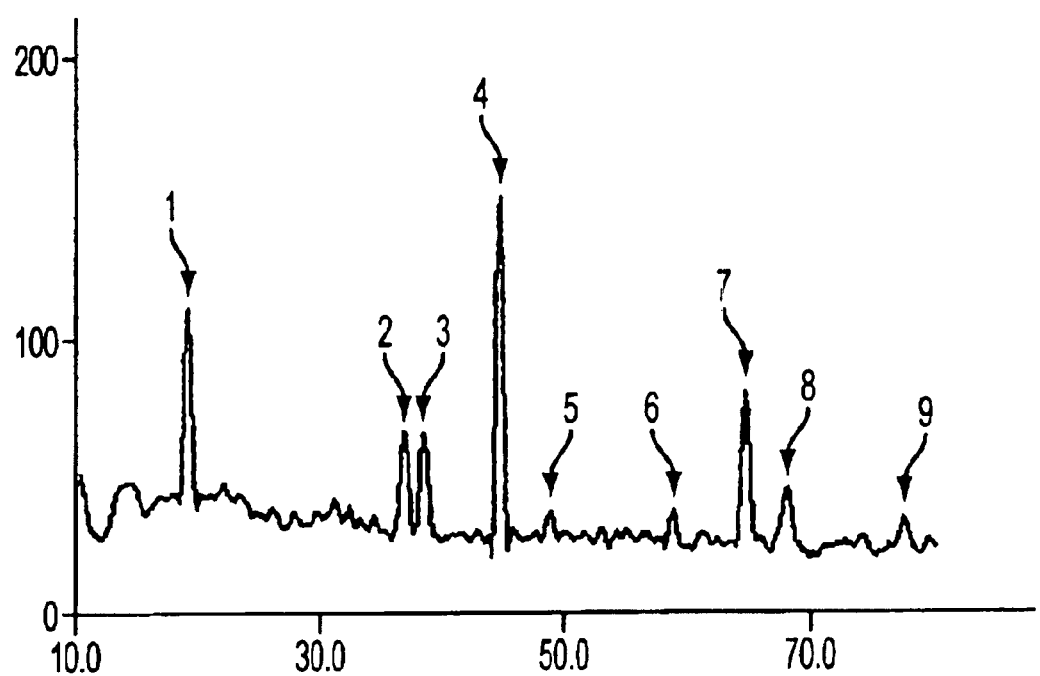
FIG. 1 shows the XRD pattern of $LiNiO_2$ prepared by reacting $Li_2O$ solid state material with solid Ni $(NO_3)_2$ at 600° C. for 12 hours.
Figure 2:
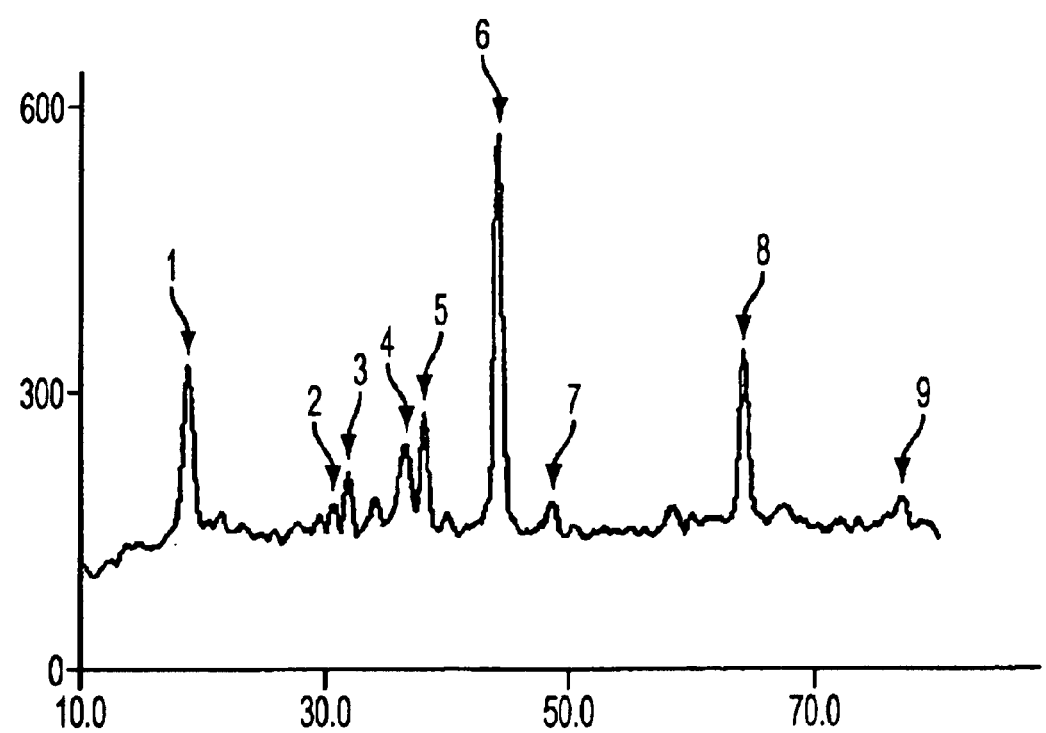
FIG. 2 shows the XRD pattern of $LiNiO_2$, prepared by reacting $Li_2O$ solid state material with solid $Ni(NO_3)_2$ at a temperature of about 500° C.

Preparation of $LiNiO_2$ Through Solid State Thermal Reaction:

(A) $Li_2O$ solid state material is allowed to react with solid $Ni(NO_3)_2$ under controlled conditions at moderate temperature which yields fairly very good sample of spinel structure useful as a very good intercalating cathode. Pure AR sample of $Ni(NO_3)_2$ is mixed with pure AR sample of $Li_2O$ in the ratio of 2:1 such that an uniform mixture is formed. This mixture when heated to 600° C. for 12 hours continuously yields lithium nickelate $LiNiO_2$ which is evidenced by X-ray analysis (FIG. 2).

(B) $Li_2O$ solid state material is allowed to react with solid $Ni(NO_3)_2$ under controlled conditions at moderate temperatures which yields fairly very good sample of spinel structure useful as a very good intercalating cathode. $Ni(NO_3)_2$ is mixed with lithium salt $Li_2O$ in the ratio of 2:1 such that an uniform mixture is formed. The mixture when heated continuously at a temperature of about 500° C. yields lithium nickelate confirmed by X-rays analysis (FIG. 2).

The following reaction occurs during the thermal process.

$$Li_2O+Ni(NO_3)_2+(O) \rightarrow 2LiNiO_2+4NO_2+2O_2$$

The following examples are given by way of illustration and therefore should not be construed to limit the scope of the present invention.

EXAMPLE-1

AR pure dry $Li_2O$ is mixed with AR pure dry $Co_3O_4$ in the ratio of 0.16:0.84 in a pestle and mortar arrangement and then the mixture is further mixed with 3 times the weight of urea and then introduced in an electric furnace. This mixture was heated first for 3 hours at 300° C. and then again heated at 700° C. for 5 hours.

| Components | Compositions |
|---|---|
| $Li_2O$ | 0.16 g* |
| $Co_3O_4$ | 0.84 g* |
| Urea | 3.00 g |
| Pre heating temperature | 300° C. |
| Final temperature | 700° C. |
| Time | 8 hours |
| Particle size of the product | 10–20 μm |
| Nature of the product | Black |
| Efficiency of the process | >90% |

EXAMPLE-2

Pure dry AR $Li_2O$ is mixed with pure dry AR $Co_3O_4$ in the molar ratio of 0.16:0.84 in a pestle and mortar arrangement and then the mix is further mixed with 3 times the weight of ammonium nitrate. The final mixture was heated first for 3 hours at 300° C. and then heated at 700° C. for 5 hours.

| Components | Compositions |
|---|---|
| $Li_2O$ | 0.16 g* |
| $Co_3O_4$ | 0.84 g* |
| Ammonium nitrate | 3.00 g |
| Pre heating temperature | 300° C. |
| Final temperature | 700° C. |
| Time | 8 hours |
| Particle size of the product | 10–20 μm |
| Nature of the product | Black |
| Efficiency of the process | >90% |

*molecular weight ratio

EXAMPLE-3

AR pure dry $Li_2O$ is mixed with AR pure dry $Ni(NO_3)_2$ in the molar ratio of 1:2 in a pestle and mortar arrangement and the mix is then introduced in an electric furnace. This mixture is heated for 12 hours at 600° C.

| Components | Compositions |
|---|---|
| $Li_2O$ | 0.5 g |
| $Ni(NO_3)_2$ | 1.0 g |
| Pre heating temperature | 100° C. |
| Final temperature | 600° C. |
| Time | 12 hours |
| Particle size of the product | 10–20 μm |
| Nature of the product | Black |
| Efficiency of the process | >80% |

EXAMPLE-4

Pure dry AR $Li_2O$ is mixed with pure dry AR $Ni(NO_3)_2$ in the molar ratio of 1:2 in a pestle and mortar arrangement and the mix is then introduced into an electric furnace and heated for 12 hours continuously at 500° C.

| Components | Compositions |
|---|---|
| $Li_2O$ | 0.5 g |
| $Ni(NO_3)_2$ | 1.0 g |
| Pre heating temperature | 100° C. |
| Final temperature* | 500° C. |
| Time | 12 hours |
| Particle size of the product | 10–20 μm |
| Nature of the product | Black |
| Efficiency of the process | >80% |

*in $LiNiO_2$, AR spectra at 500° C. The peak at 2θ=68° is not well formed and the peak at 2θ=31° is present when compared to the standard.

The Main Advantages of the Present Invention Are

1. It is a single step solid state thermal process
2. $Li_2O$ is used to react with $Co_3O_4$ to form $LiCoO_2$ and with $Ni(NO_3)_2$ to obtain $LiNiO_2$ of high capacity cathode for intercalation
3. Heating time is considerably less, and hence considerable-heating time can be saved.

We claim:

1. A solid state thermal process for the preparation of lithium cathode materials of the general formula $LiMO_2$ where M is Co, which comprises preparing a solid mixture of lithium oxide ($Li_2O$) and $Co_3O_4$ in stoichiometric proportions, adding urea or ammonium nitrate in an amount effective as a self heat generating material to prepare a uniform reaction mixture, and heating the resulting mixture at a temperature in the range of 400 to 750° C. to recover lithium cobaltate.

2. A process as claimed in claim 1 wherein the reactants are of analytical reagent grade.

3. A process as claimed in claim 1 wherein the ratio of $Li_2O+Co_3O_4$ mixture and urea or ammonium nitrate additive is 1:3.

4. A process as claimed in claim 1 wherein the $Li_2O$ is mixed with $Co_3O_4$ in the following proportion $Li_2O$:$Co_3O_4$=0.16:0.84 (per gram).

5. A process as claimed in claim 1 wherein the process is a single step heat treatment process.

6. A process as claimed in claim 1 wherein no side reactions occur.

7. A solid state thermal process for the preparation of lithium cathode materials of the general formula $LiMO_2$ where M is Co, which comprises preparing a solid mixture of lithium oxide ($Li_2O$) and $Co_3O_4$ in stoichiometric proportions, adding urea or ammonium nitrate in an amount effective as a self heat generating material to prepare a uniform reaction mixture, preheating the uniform reaction mixture, grinding the preheated reaction mixture with water free ethylene carbonate, and heating the resulting mixture at a temperature in the range of 450 to 750° C. to recover lithium cobaltate.

* * * * *